(12) United States Patent
Yamashita et al.

(10) Patent No.: US 6,407,866 B1
(45) Date of Patent: Jun. 18, 2002

(54) METHOD FOR MANUFACTURING MICROLENS SUBSTRATE, MICROLENS SUBSTRATE, OPPOSING SUBSTRATE FOR LIQUID CRYSTAL PANEL, LIQUID CRYSTAL PANEL, AND PROJECTION DISPLAY APPARATUS

(75) Inventors: Hideto Yamashita; Nobuo Shimizu, both of Suwa; Shinichi Yotsuya, Chino, all of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/747,330

(22) Filed: Dec. 21, 2000

(30) Foreign Application Priority Data

Dec. 27, 1999 (JP) .......................... 11-371197

(51) Int. Cl.⁷ ............................................. G02B 27/10
(52) U.S. Cl. ....................................... 359/619; 359/618
(58) Field of Search ................. 359/618, 619, 359/621; 349/95, 112, 57; 430/320, 321; 264/1.32, 2.5; 65/17.3

(56) References Cited

U.S. PATENT DOCUMENTS

| | | | | |
|---|---|---|---|---|
| 4,092,277 A | * | 5/1978 | Moore | 521/114 |
| 5,298,366 A | * | 3/1994 | Iwasaki et al. | 359/619 |
| 5,543,942 A | * | 8/1996 | Mizuguchi et al. | 359/619 |
| 5,670,096 A | * | 9/1997 | Lu | 264/1.1 |
| 6,304,384 B1 | * | 10/2001 | Nishikawa | 359/619 |

* cited by examiner

Primary Examiner—Georgia Epps
Assistant Examiner—Alicia M. Harrington
(74) Attorney, Agent, or Firm—Harness, Dickey & Pierce, P.L.C.

(57) ABSTRACT

A microlens substrate 1 includes a glass substrate 2 provided with a number of concavities 3 for microlenses, and a glass layer 8 bonded via a resin layer 9 to the glass substrate 2 at a surface thereof provided with the concavities 3. In the resin layer 9, microlenses 4 are formed with a resin filling the concavities 3. The resin layer 9 is formed by curing a resin having a viscosity before curing of not higher than 500 cP at 25° C., particularly an ultraviolet curable resin. An index of refraction n of the resin layer 9 is preferably not lower than 1.35.

15 Claims, 5 Drawing Sheets

| | (cP): Viscosity (cP) Of Resin At 25°C | n: Refraction Index n | Major Component | (mJ/cm²): Light Amount For Curing (mJ/cm²) | Level Of Remaining Air Bubbles | Deflection Of Cover Glass | Non-Uniformity In Luminance Of Emitted Light |
|---|---|---|---|---|---|---|---|
| Example 1 | 70 | 1.39 | Acryl | 2000 | ◎ | ◎ | ◎ |
| Example 2 | 200 | 1.56 | Acrylic Epoxy | 1000 | ◎ | ◎ | ○~◎ |
| Example 3 | 300 | 1.65 | Acryl | 6000 | ◎ | ○ | ○ |
| Example 4 | 11 | 1.58 | Acryl | 6000 | ◎ | ◎ | ◎ |
| Example 5 | 11 | 1.58 | Acryl | 6000 | ◎ | ◎ | ◎ |
| Example 6 | 400 | 1.56 | Epoxy | 6000 | ○ | ○ | ○ |
| Example 7 | 130 | 1.61 | Acryl | 700 | ◎ | ◎ | ◎ |
| Example 8 | 15 | 1.63 | Modified Vinyl | 6000 | ◎ | ◎ | ◎ |
| Example 9 | 35 | 1.66 | Thiourethane | *120°C x Heat For 240 Minutes | ◎ | ◎ | ◎ |
| Example 10 | 35 | 1.60 | Thiourethane | *120°C x Heat For 240 Minutes | ◎ | ◎ | ◎ |
| Comparative Example 1 | 1200 | 1.59 | Epoxy | 3000 | Δ | X | X |
| Comparative Example 2 | 1500 | 1.54 | Acryl | 1300 | X | X | X |

*Thermosetting Resins Are Used In Examples 9 and 10.

| | (cP): Viscosity (cP) Of Resin At 25°C | n: Refraction Index n | Major Component | (mJ/cm²): Light Amount For Curing (mJ/cm²) | Level Of Remaining Air Bubbles | Deflection Of Cover Glass | Non-Uniformity In Luminance Of Emitted Light |
|---|---|---|---|---|---|---|---|
| Example 1 | 70 | 1.39 | Acryl | 2000 | ◎ | ◎ | ◎ |
| Example 2 | 200 | 1.56 | Acrylic Epoxy | 1000 | ◎ | ◎ | ○~◎ |
| Example 3 | 300 | 1.65 | Acryl | 6000 | ◎ | ○ | ○ |
| Example 4 | 11 | 1.58 | Acryl | 6000 | ◎ | ◎ | ◎ |
| Example 5 | 11 | 1.58 | Acryl | 6000 | ○ | ○ | ◎ |
| Example 6 | 400 | 1.56 | Epoxy | 6000 | ◎ | ◎ | ○ |
| Example 7 | 130 | 1.61 | Acryl | 700 | ◎ | ◎ | ◎ |
| Example 8 | 15 | 1.63 | Modified Vinyl | 6000 | ◎ | ◎ | ◎ |
| Example 9 | 35 | 1.66 | Thiourethane | *120°C x Heat For 240 Minutes | ◎ | ◎ | ◎ |
| Example 10 | 35 | 1.60 | Thiourethane | *120°C x Heat For 240 Minutes | ◎ | ◎ | ◎ |
| Comparative Example 1 | 1200 | 1.59 | Epoxy | 3000 | △ | × | × |
| Comparative Example 2 | 1500 | 1.54 | Acryl | 1300 | × | × | × |

*Thermosetting Resins Are Used In Examples 9 and 10.

METHOD FOR MANUFACTURING MICROLENS SUBSTRATE, MICROLENS SUBSTRATE, OPPOSING SUBSTRATE FOR LIQUID CRYSTAL PANEL, LIQUID CRYSTAL PANEL, AND PROJECTION DISPLAY APPARATUS

TECHNICAL FIELD OF THE INVENTION

The present invention relates to a method for manufacturing a microlens substrate, and to a microlens substrate, an opposing substrate for a liquid crystal panel, a liquid crystal panel, and a projection display apparatus.

DESCRIPTION OF THE RELATED ART

Hitherto, a projection display apparatus for projecting images on a screen has been known. In a projection display apparatus of this type, liquid crystal panels (liquid crystal optical shutters) are generally used for forming images.

The liquid crystal panel includes, for example, a liquid crystal driving substrate for driving liquid crystals and an opposing substrate for a liquid crystal panel bonded to each other via a liquid crystal layer. Some liquid crystal panels are provided with a number of minute microlenses in positions, each corresponding to a pixel of the opposing substrates for liquid crystal panels. Light transmitted by the opposing substrate for a liquid crystal panel is condensed by the microlenses, thereby improving the transmissivity of the light. The microlenses are generally formed on a microlens substrate provided in the liquid crystal panel.

A known microlens substrate includes a glass substrate provided with a number of concavities, a glass layer bonded to the glass substrate at a surface thereof provided with the concavities via a resin layer, and microlenses formed with a resin filling the concavities.

In order to obtain a maximum power of the microlenses, a resin having a highest possible index of refraction is used for forming the resin layer disposed between the glass substrate and the glass layer. The resin having a high index of refraction has relatively high viscosity before curing. Therefore, a problem occurs, as described below.

When the glass substrate and the glass layer are bonded to each other via the resin, non-uniformity in the thickness of the resin layer obtained by curing the resin is produced due to low fluidity of the resin because of the relatively high viscosity thereof. Due to low fluidity of the resin, air bubbles are difficult to remove in a bonding process, whereby there is a risk of the air bubbles remaining in the resin layer. Non-uniformity in the thickness of the resin layer and remaining air bubbles will deteriorate the optical characteristics.

Accordingly, an object of the present invention is to provide a method for manufacturing a microlens substrate, and to provide a microlens substrate, an opposing substrate for a liquid crystal panel provided with the microlens substrate, a liquid crystal panel, and a projection display apparatus, in which the thickness of a resin layer is made uniform, and air bubbles are prevented from remaining.

SUMMARY OF THE INVENTION

To the end, according to the present invention, a method for manufacturing a microlens substrate comprises the steps of preparing a glass substrate provided with a number of concavities formed on a surface thereof; supplying a resin having a viscosity before curing of not greater than 500 cP at a temperature of 25° C. onto the surface of the glass substrate provided therein with the concavities; bonding a glass layer to the glass substrate via the resin; and forming microlenses in the concavities by curing the resin. An index of refraction n of the resin after curing is preferably not lower than 1.35. The resin may be an ultraviolet curable resin.

A microlens substrate according to the present invention, manufactured by the method according to the present invention, comprises a glass substrate provided with a number of concavities; a glass layer bonded to the glass substrate via a resin layer; and microlenses formed with a resin filling the concavities.

The resin layer is formed by curing a resin having a viscosity before curing of not higher than 500 cP at 25° C.

An index of refraction n of the resin after curing is preferably not lower than 1.35. The resin may be an ultraviolet curable resin. The microlens substrate and a transparent conductive film provided on the glass layer or the glass substrate are preferably included. A liquid crystal panel may be configured with the microlens substrate, a black matrix provided on the glass layer or on the glass substrate, and a transparent conductive film covering the black matrix. The liquid crystal panel may include an opposing substrate for a liquid crystal panel.

A liquid crystal panel is enabled, which includes a liquid crystal driving substrate provided with a plurality of pixel electrodes, the opposing substrate for a liquid crystal panel bonded to the liquid crystal driving substrate, and liquid crystals sealed into a gap between the liquid crystal driving substrate and the opposing substrate for a liquid crystal panel. Preferably, the liquid crystal driving substrate is a TFT substrate. A projection display apparatus is enabled, which includes light valves having the liquid crystal panels, and projects images by using at least one of the light valves. The projection display apparatus is enabled, which includes three light valves corresponding to red, green, and blue, a light source, a color-splitting optical system for splitting light from the light source into red, green, and blue light beams and guiding the light beams to the corresponding light valves, a color-synthesizing optical system for synthesizing the images, and a projection display apparatus for projecting the synthesized images. In the projection display apparatus, the light valves include the liquid crystal panels.

DETAILED DESCRIPTION OF THE PREFERRED EMBODIMENTS

According to preferred examples of the present invention, a method for manufacturing a microlens substrate, and a microlens substrate, an opposing substrate for a liquid crystal panel, a liquid crystal panel, and a projection display apparatus are described below with reference to the attached drawings. The microlens substrate according to the present invention includes an individual substrate and a wafer.

Figures 1, 6:
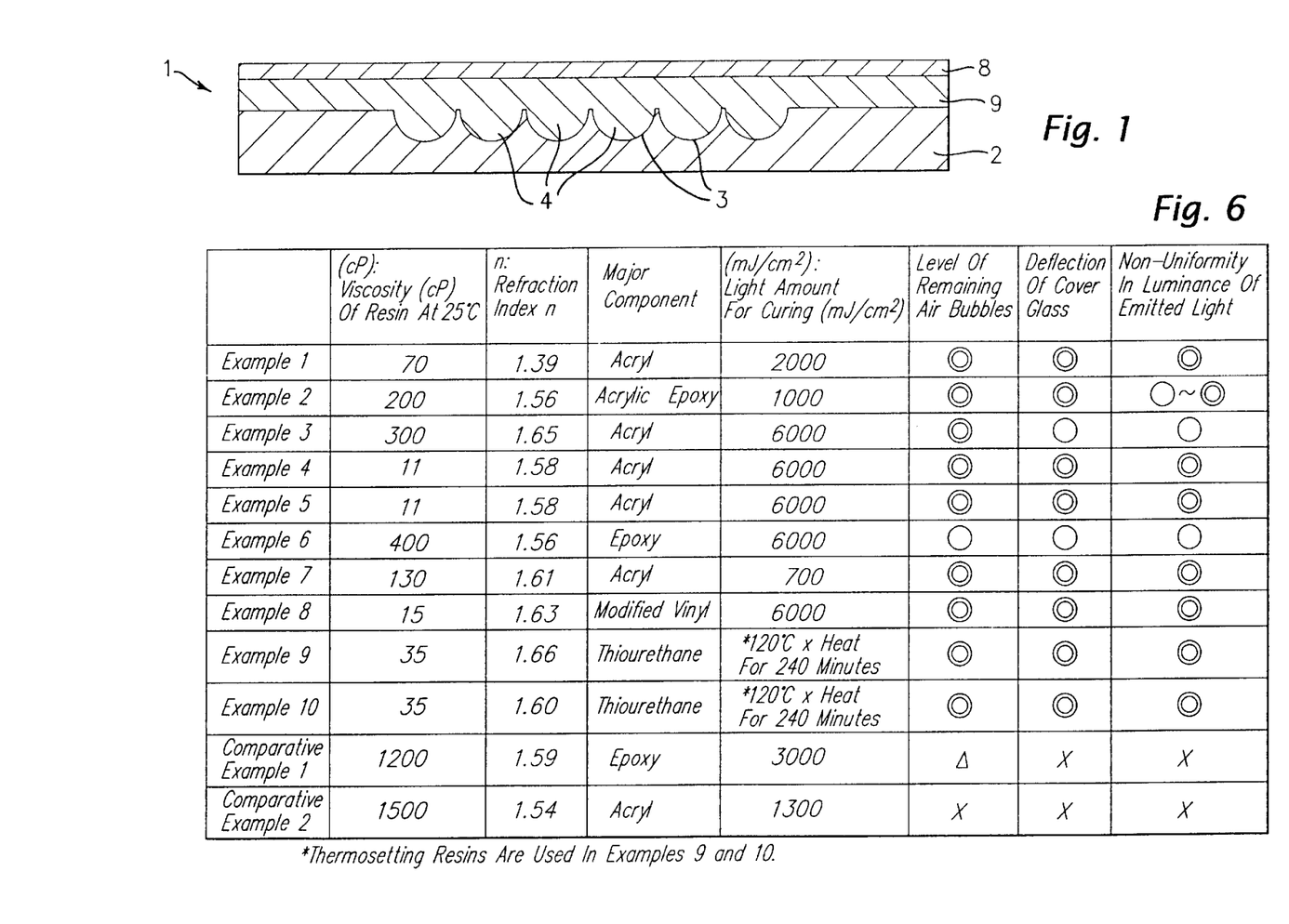
FIG. 1 is a schematic longitudinal-sectional view showing an embodiment of a microlens substrate according to the present invention.
FIG. 6 is a table describing a resin used according to the present invention.

FIG. 1 is a schematic longitudinal-sectional view for describing an example of the microlens substrate according to the present invention.

As shown in the drawing, a microlens substrate 1 includes a glass substrate (substrate provided with concavities for microlenses) 2 provided thereon with a number of concavities 3, a glass layer (cover glass) 8 bonded to the glass substrate 2 at a surface thereof provided with the concavities 3 via a resin layer (adhesive layer) 9, and the resin layer 9 for bonding (connecting) the glass substrate 2 and the glass layer 8 to each other. The resin layer 9 includes microlenses 4 formed with a resin filling the concavities 3.

By making the resin layer 9 of a resin described below, according to the present invention, the thickness of the resin layer 9 can be made even, and air bubbles can be prevented from remaining in the resin layer 9.

An example, according to the present invention, of a method for manufacturing the microlens substrate 1 is described below.

When the microlens substrate 1 is manufactured, the glass substrate 2 provided with a number of the concavities 3 formed in a surface thereof must be prepared. The glass substrate 2 can be manufactured, for example, as described below (see FIG. 2).

For example, the green glass substrate 2 is prepared as a base material. The glass substrate 2, which has a uniform thickness and is free from deflection and scratches, is properly used.

When the microlens substrate 1 is used in a liquid crystal panel, and the liquid crystal panel includes a glass substrate (for example, a glass substrate 171 described below) other than the glass substrate 2, the thermal expansion coefficient of the glass substrate 2 is preferably substantially the same as the thermal expansion coefficient of the other glass substrate included in the liquid crystal panel. When the thermal expansion coefficient of the glass substrate 2 and that of the other glass substrate included in the liquid crystal panel are substantially the same as each other, bent, deflection, separation, and the like are prevented from occurring due to the difference in thermal expansion coefficient between the two substrates.

Accordingly, the glass substrate 2 and the other glass substrate, which the liquid crystal panel includes, are preferably made of the same material. With this arrangement, bent, deflection, and the like, which occur due to the difference in thermal expansion when the temperature varies, can be efficiently avoided.

In particular, when the microlens substrate 1 is used in a TFT liquid crystal panel of a high-temperature polysilicon, the glass substrate 2 is preferably made of silica glass. The TFT liquid crystal panel includes a TFT substrate as a liquid crystal driving substrate. Silica glass, of which characteristics are not likely to change due to the change of environment during manufacturing, is preferably used in the TFT substrate. Therefore, by making the glass substrate 2 of silica glass, a stable TFT liquid crystal panel can be obtained, in which bent, deflection, and the like are not likely to occur.

The thickness of the glass substrate 2 differs in accordance with various conditions, such as a material of the glass substrate 2, the index of refraction, and the like. Generally, the thickness is preferably in the order of 0.3 to 5 mm, and more preferably in the order of 0.5 to 2 mm. When the thickness is set in these ranges, the compact microlens substrate 1 having necessary optical characteristics can be obtained.

Figure 2A:
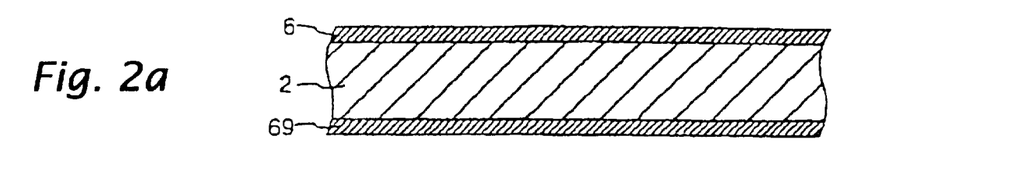
FIG. 2 includes illustrations showing a manufacturing method of the microlens substrate according to the example of the present invention.

<1> A mask layer 6 is formed on a surface of the glass substrate 2, as shown in FIG. 2(a). A rear-surface protection layer 69 is formed on a rear surface (the surface opposite to that which is provided with the mask layer 6) of the glass substrate 2.

The mask layer 6 preferably has resistibility to an operation performed in the following process <3>.

Therefore, for example, metals such as Au/Cr, Au/Ti, Pt/Cr, or Pt/Ti, silicon such as polycrystalline silicon (polysilicon), amorphous silicon, or a nitride-based silicon are used as a material for the mask layer 6.

The thickness of the mask layer 6 is not particularly specified. However, it is preferably in the order of 0.01 to 10 $\mu$m, and more preferably in the order of 0.2 to 1 $\mu$m. When the thickness is smaller than a lower limit value of the range, there is a risk of being unable to sufficiently protect the glass substrate 2. When the thickness exceeds an upper limit value of the range, the mask layer 6 is likely to be separated due to an interior stress of the mask layer 6.

The mask layer 6 can be formed by, for example, a vapor-phase film deposition method, such as chemical vapor deposition (CVD), sputtering, or vapor deposition, or plating.

The rear-surface protection layer 69 serves to protect the rear surface of the glass substrate 2 in the subsequent processes. The rear-surface protection layer 69 appropriately protects the glass substrate 2 against erosion, deterioration, and the like at the rear surface thereof. The rear-surface protection layer 69 is made of the same material, for example, as the mask layer 6. Therefore, the rear-surface protection layer 69 may be formed simultaneously with the mask layer 6 and in the same fashion as the mask layer 6.

Figure 2B:
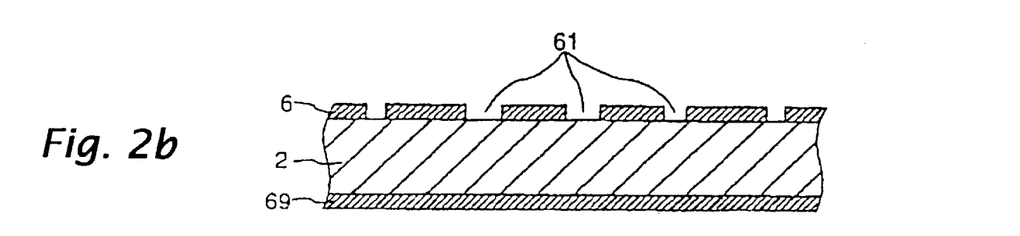
Figure 2C:
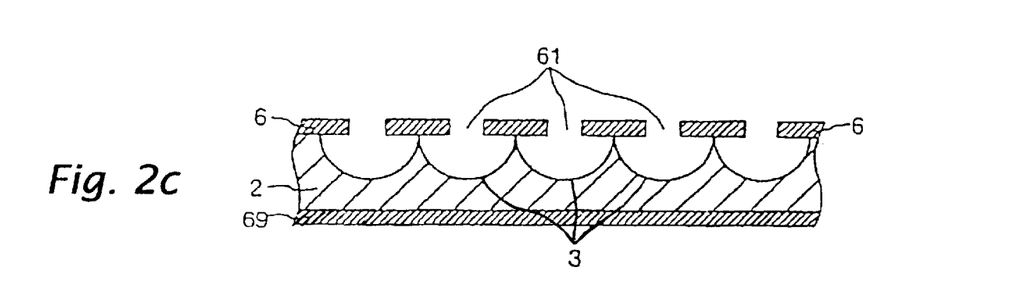

<2> Openings 61 are formed in the mask layer 6, as shown in FIG. 2(b).

The openings 61 are formed in positions in which the concavities 3 are formed. The shape of the openings 61 preferably corresponds to the shape of the concavities 3.

The openings 61 may be formed in a manner described below. A resist layer (not shown) having a pattern corresponding to the openings 61 is formed on the mask layer 6. The mask layer 6 is partly removed by using the resist layer as a mask, and the resist layer is removed.

The mask layer 6 is partly removed by, for example, dry etching by a CF gas, a chlorine-based gas, or the like, or dipping in a stripping agent (wet etching) such as an aqueous solution of fluoric acid and nitric acid or an aqueous alkaline solution.

<3> A number of the concavities 3 are formed in the glass substrate 2.

The concavities 3 are formed by an etching method, such as dry etching or wet etching. Particularly, by wet etching, the concavities 3 can be formed in a shape close to an idealistic lens-shape. For example, a fluoric-acid-based etching agent is appropriately used as an etching agent when wet-etching.

By etching, for example, the transparent substrate 2 is etched in the same direction from the openings 61, whereby the concavities 3 having a lens-shape are formed.

Figure 2D:
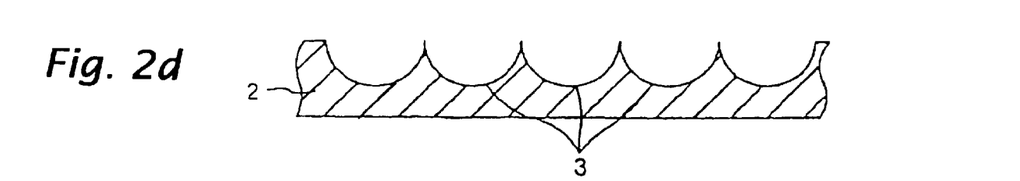

<4> As shown in FIG. 2(d), the mask layer 6 is removed. In this case, the rear-surface protection layer 69 is also removed when the mask layer 6 is removed.

The removal may be performed by, for example, dipping in a stripping agent (wet etching), such as an aqueous alkaline solution (for example, an aqueous solution of tetramethyl ammonium hydroxide), an aqueous solution of hydrochloric acid and nitric acid, or an aqueous solution of fluoric acid and nitric acid, or dry etching by a CF gas or a chlorine-based gas.

Thus, as shown in FIG. 2(d), the glass substrate (substrate provided with concavities for microlenses) 2, which is provided with a number of the concavities 3 formed on a surface thereof, can be obtained.

By using the glass substrate 2, the microlens substrate 1 is manufactured, for example, as described below.

<5> A resin (for forming the resin layer 9) before curing is supplied onto the surface of the glass substrate 2 provided with the concavities 3 formed thereon. This can be performed by applying a resin before curing to, for example, the glass substrate 2 on the overall surface thereof provided with the concavities 3.

Figure 5:
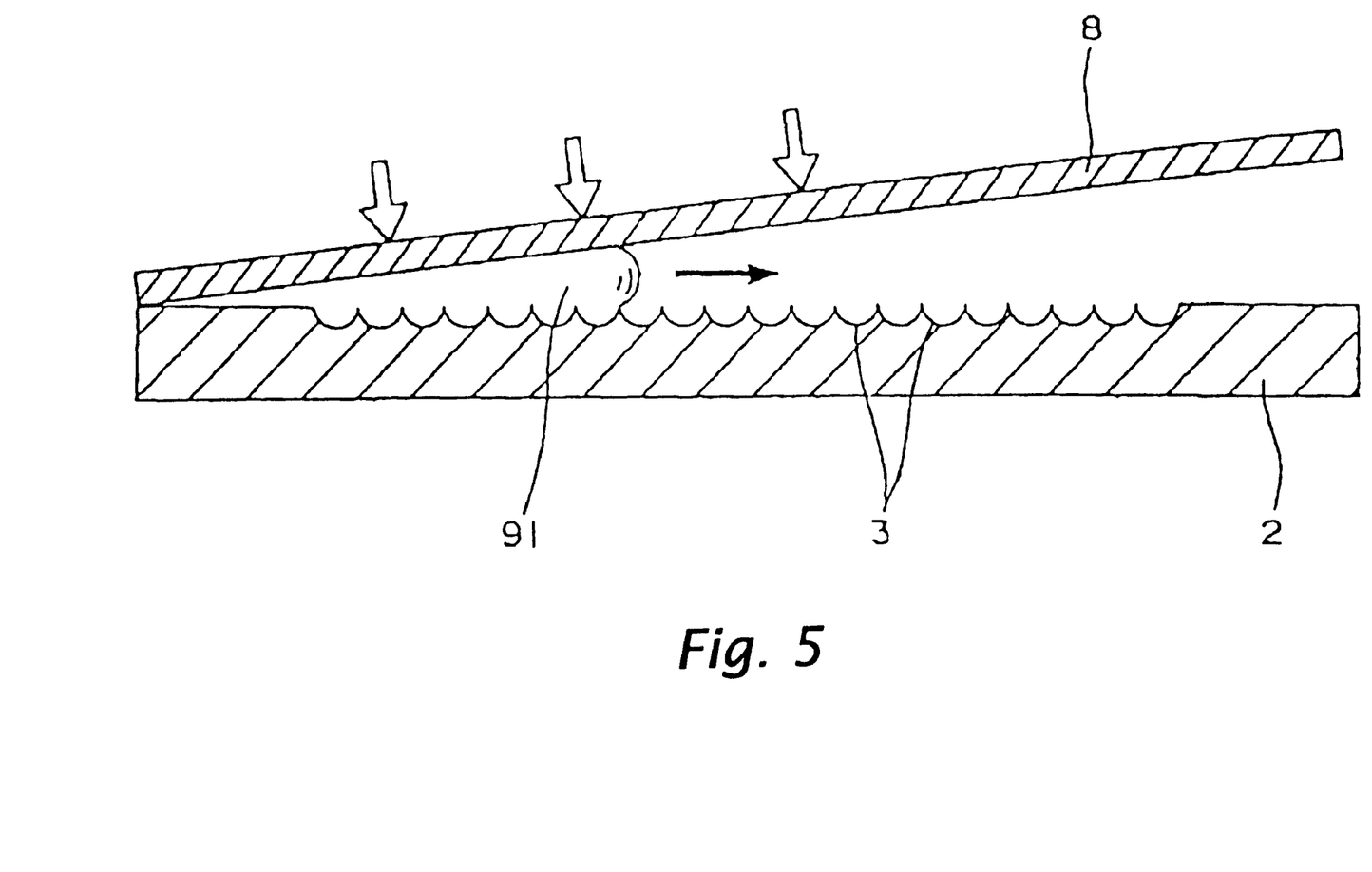
FIG. 5 is an illustration showing an operation in which a glass layer is bonded to a glass substrate via a resin.

As shown in FIG. 5, a glass layer 8 described in the subsequent process is prepared, a resin 91 before curing is supplied in a slightly excessive amount to an end part (to the left in FIG. 5) between the glass substrate 2 and the glass layer 8, the glass layer 8 is depressed gradually from the end part toward the other end part (to the right in FIG. 5), whereby the resin 91 before curing moves between the glass substrate 2 and the glass layer 8 toward the other end part and is spread. By this operation, the resin 91 before curing can be supplied in a laminated state to the overall region of the glass substrate 2 provided with the concavities 3. The distance between the glass substrate 2 and the glass layer 8, that is, the thickness of a layer of the resin 91 can be controlled by applying pressure evenly over the glass layer 8, as needed.

The resin 91 before curing has a viscosity of not higher than 500 cP (centipoise) at 25° C., preferably not higher than 350 cP, and more preferably in a range of 230 to 3 cP. By using a resin having such a low viscosity, the resin can be supplied at high fluidity, whereby the resin can be supplied without producing unevenness (in an even thickness). Therefore, the resin layer 9 can be formed in a uniform thickness. Moreover, air bubbles can be easily removed when bonding the glass layer 8 in the subsequent process, whereby the air bubbles remaining in the resin 91 and the resin layer 9 can be suppressed or avoided.

An index of refraction n of the resin (after curing) forming the resin layer 9 is not particularly specified. However, it is preferably higher than the index of refraction of the glass substrate 2. Particularly, the index of refraction n is preferably not lower than 1.35, more preferably not lower than 1.5, and even more preferably in the order of 1.5 to 1.72. When the index of refraction n is set in these ranges, the difference from the index of refraction of the glass substrate 2 can be set large, whereby the power of the microlenses 4 can be fully obtained, thereby improving the efficiency in use of the light.

The resin for forming the resin layer 9 may be selected from, for example, an acrylic resin, an epoxy resin, an acrylic epoxy resin, a vinyl resin, or a thiourethane resin. In particular, an ultraviolet curable resin, such as an acrylic resin, an epoxy resin, an acrylic epoxy resin, or a vinyl resin is preferable. When a liquid crystal panel is manufactured by using the microlens substrate, the microlens substrate is exposed to an ultraviolet light in a manufacturing process. To cope with this situation, the above ultraviolet curable resins have superior ultraviolet-resistant properties (UV-resistant properties). Particularly, when an acrylic resin, an epoxy resin, or an acrylic epoxy resin is used, the resin can be easily controlled so as to have a desired index of refraction, whereby the microlens substrate 1 having superior optical characteristics can be easily obtained.

<6> A glass layer 8 is bonded on the resin supplied onto the glass substrate 2 in the process <5>.

The glass layer 8 is bonded to the glass substrate 2 on a resin before curing having been applied to the overall surface of the glass substrate 2 on which the concavities 3 are formed, or the glass layer 8 is bonded in a manner such that the resin before curing is supplied in a slightly excessive amount to an end part between the glass substrate 2 and the glass layer 8, the glass layer 8 is depressed gradually from the end part toward the other end part, and the resin before curing moves so as to spread between the glass substrate 2 and the glass layer 8 toward the other end part, whereby the resin before curing is supplied in a laminated state to the overall region of the glass substrate 2 provided with the concavities 3, and the glass layer 8 is bonded to the glass substrate 2 via the layer of the resin. Since the resin has a low viscosity, as described above, it has high fluidity, whereby air bubbles therein can be removed easily even when they exist between the glass substrate 2 and the glass layer 8.

The thermal expansion coefficient of the glass layer 8 is preferably substantially the same as that of the other glass substrate included in the liquid crystal panel to be manufactured because of the same reason as described above. Accordingly, the glass layer 8 is preferably made of the same material as that of the other glass substrate included in the glass layer 8 and the liquid crystal panel. Particularly, when the microlens substrate 1 is used in manufacturing a TFT liquid crystal panel of a high-temperature polysilicon, the glass layer 8 is preferably made of silica glass because of the reason described above.

<7> The resin is cured, thereby forming the resin layer 9.

The microlenses 4 are formed in the concavities 3 with the resin (after curing) forming the resin layer 9.

The resin is cured by, for example, applying an ultraviolet light or an electron beam to the resin, or heating the resin.

The thickness of the resin layer 9 (the thickness of an effective part of the glass substrate 2) is preferably in the order of 0.1 to 100 $\mu$m, and more preferably in the order of 1 to 20 $\mu$m.

<8> Then, the thickness of the glass layer 8 may be adjusted by grinding, polishing, or the like.

Figure 2E:
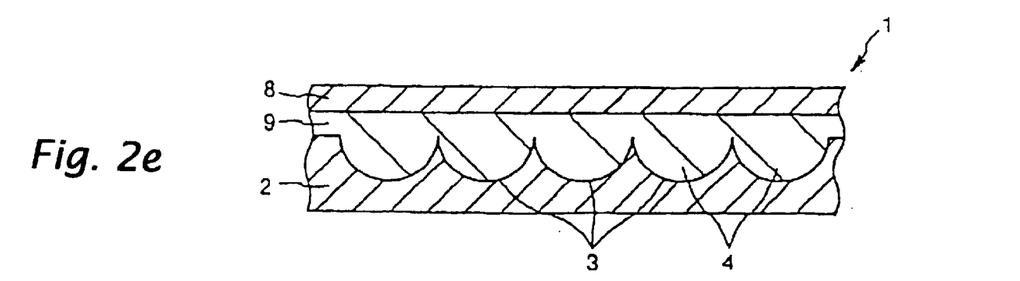

Thus, the microlens substrate 1 shown in FIGS. 1 and 2(e) can be obtained.

The microlens substrate 1 thus formed includes the resin layer 9 made of the above resin, whereby the thickness thereof is uniform and even, and air bubbles do not remain.

When the microlens substrate 1 is used in a liquid crystal panel, generally, the thickness of the glass layer 8 is preferably in the order of 10 to 1000 $\mu$m, and more preferably in the order of 20 to 150 $\mu$m, so as to obtain necessary optical characteristics. When the liquid crystal panel is formed so that the light is applied from the glass layer 8 side, (in other words, when a black matrix or a transparent conductive film is formed on the glass substrate 2 (described below), and when the liquid crystal panel is formed so that the glass substrate 2 and a TFT substrate 17 (glass substrate 171) to be described below are disposed opposing each other), the thickness of the glass layer 8 is preferably in the order of 0.3 to 5 mm, and more preferably in the order of 0.5 to 2 mm.

The microlens substrate may be applied to various usages, such as a microlens substrate for a CCD and a microlens substrate for an optical communication device, other than an opposing substrate for a liquid crystal panel and a liquid crystal panel which are described below.

Figure 3:
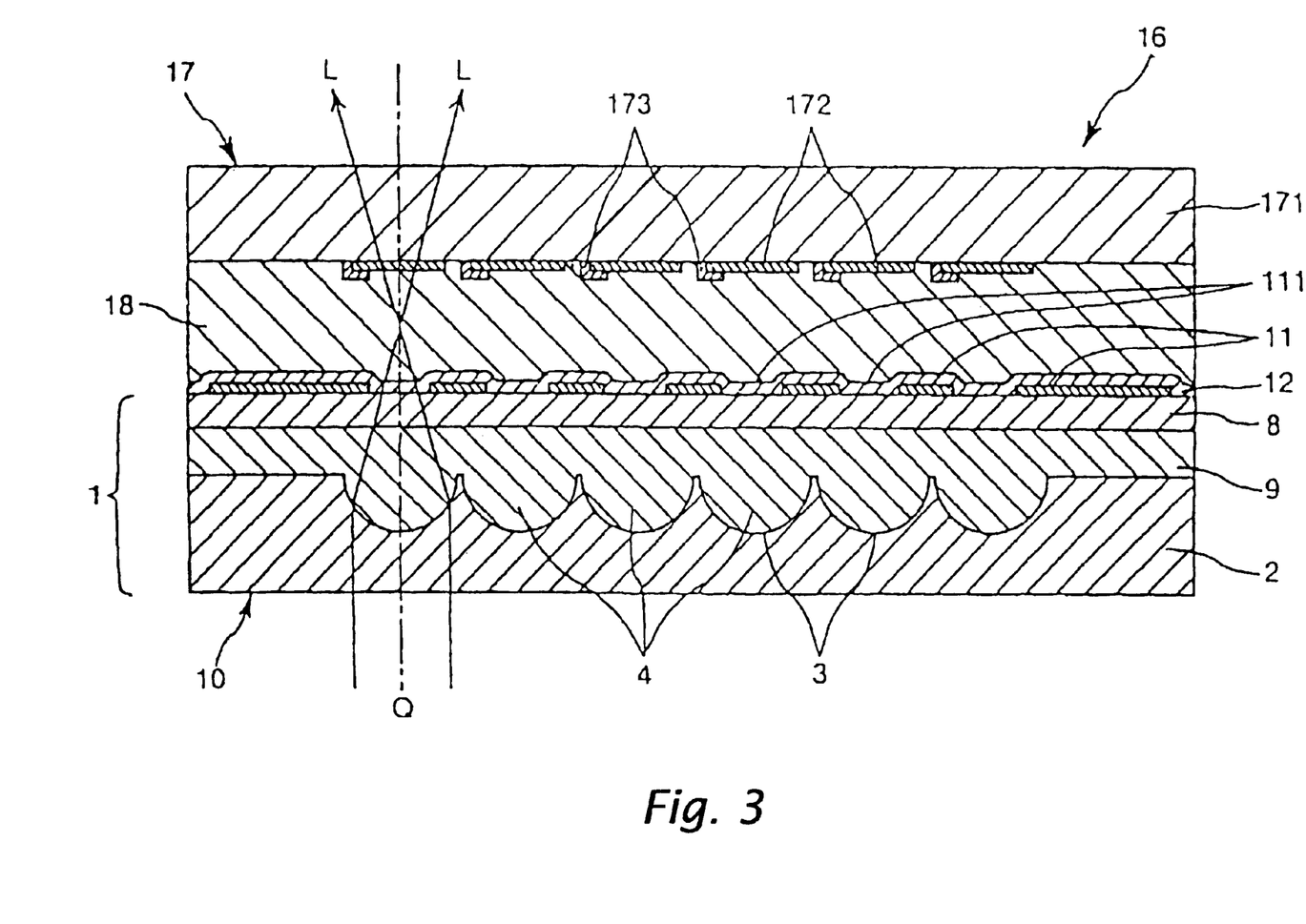
FIG. 3 is a schematic longitudinal-sectional view showing the example of a liquid crystal panel according to the present invention.

<9> For example, a black matrix 11 having openings 111 is formed on the glass layer 8 of the microlens substrate 1, and a transparent conductive film 12 is formed so as to cover the black matrix 11, whereby an opposing substrate for a liquid crystal panel is manufactured (see FIG. 3).

The black matrix 11 and the transparent conductive film 12 may be provided on the transparent substrate 2 instead of on the glass layer 8.

The black matrix 11 has a light shielding function, and made of, for example, a metal, such as Cr, Al, an Al-alloy, Ni, Zn, or Ti, or a resin containing carbon or titanium dispersed therein.

The transparent conductive film 12 is electrically conductive, and made of, for example, indium tin oxide (ITO), indium oxide (IO), or tin oxide ($SnO_2$).

The black matrix 11 is formed in a process such that a thin film to serve as the black matrix 11 is deposited on, for example, the glass layer 8 by a vapor-phase film-deposition method (for example, vapor deposition, sputtering, or the like), a resist film is deposited on the thin film, the resist film having a pattern of the openings 111, the openings 111 are formed in the thin film by wet etching, and the resist film is removed.

The transparent conductive film 12 may be formed by a vapor-phase film deposition method, such as vapor deposition or sputtering.

The black matrix 11 is not necessarily provided.

A liquid crystal panel (liquid crystal optical shutter) using the opposing substrate for a liquid crystal panel is described below with reference to FIG. 3.

In FIG. 3, a liquid crystal panel (a TFT liquid crystal panel) 16 according to the present invention includes a TFT substrate (liquid crystal driving substrate) 17, an opposing substrate 10 for a liquid crystal panel bonded to the TFT substrate 17, and a liquid crystal layer 18 including liquid crystals sealed in a gap between the TFT substrate 17 and the opposing substrate 10 for a liquid crystal panel.

The opposing substrate 10 for a liquid crystal panel includes the microlens substrate 1, the black matrix 11 provided with the openings 111 and disposed on the glass layer 8 of the microlens substrate 1, and the transparent conductive film (common electrode) 12 disposed so as to cover the black matrix 11 on the glass layer 8.

The TFT substrate 17 is a substrate which drives the liquid crystals of the liquid crystal layer 18, and includes a glass substrate 171, a number of pixel electrodes (individual electrodes) 172 disposed on the glass substrate 171, and a number of thin-film transistors (TFT) 173 associating with the pixel electrodes 172, respectively. In the drawing, sealing materials, orientation films, wirings, and the like are omitted.

In the liquid crystal panel 16, the TFT substrate 17 and the opposing substrate 10 for a liquid crystal panel are bonded to each other at a predetermined distance therebetween so that the transparent conductive film 12 of the opposing substrate 10 for a liquid crystal panel opposes the pixel electrodes 172 of the TFT substrate 17.

The glass substrate 171 is preferably made of silica glass because of the above-described reason.

The pixel electrodes 172 drives the liquid crystals of the liquid crystal layer 18 by charging and discharging between the transparent conductive film (common electrode) 12. The pixel electrodes 172 are made of, for example, the same material as that of the transparent conductive film 12 described above.

The thin-film transistors 173 are connected to the adjacent and associating pixel electrodes 172. The thin-film transistors 173 are connected to a control circuit which is no t shown, and control electrical current supplied to the pixel electrodes 172, thereby controlling the charge and discharge of the pixel electrodes 172.

The liquid crystal layer 18 contains liquid crystal molecules (not shown). The orientation of the liquid crystal molecules, that is, the orientation of liquid crystals changes in accordance with,the charge and discharge of the pixel electrodes 172.

Generally, in the liquid crystal panel 16, one pixel associates with one microlens 4, one opening 111 of the black matrix 11, corresponding to an optical axis Q of the microlens 4, one pixel electrode 172, and one thin-film transistor 173 connected to the pixel electrode 172.

An incident light L applied to the opposing substrate 10 for a liquid crystal panel passes through the glass substrate 2, is condensed by the microlens 4, and is transmitted through the resin layer 9, the glass layer 8, the opening 111 of the black matrix 11, the transparent conductive film 12, the liquid crystal layer 18, the pixel electrode 172, and the glass substrate 171. Since a polarizer (not shown) is generally provided at the incidence side of the microlens substrate 1, the incident light L has been converted into a linear polarized light when the incident light L is transmitted by the liquid crystal layer 18. In this case, the polarization direction of the incident light L is controlled in accordance with the orientated state of liquid crystal molecules of the liquid crystal layer 18. Therefore, the luminance of an emitted light can be controlled by applying the incident light L having been transmitted through the liquid crystal panel 16 to a polarizer (not shown).

Thus, the liquid crystal panel 16 includes the microlenses 4, and the incident light L passing each microlens 4 is condensed and passes each opening 111 of the black matrix 11. The incident light L is shielded in a region in which the openings 111 of the black matrix 11 are not formed. Therefore, in the liquid crystal panel 16, unnecessary light is prevented from leaking from the region other than that which is provided with the pixels, and the attenuation of the incident light L to the pixel region is suppressed. Therefore, the liquid crystal panel 16 has a high transmissivity at the pixels, and can form bright and clear images with a relatively small light amount.

The liquid crystal panel 16 can be manufactured in a manner such that, for example, the TFT substrate 17 and the opposing substrate 10 for a liquid crystal panel individually manufactured by known methods and orientation-processed are bonded to each other via a sealing material (not shown), liquid crystals are injected into a gap thus formed through an injection hole (not shown) communicating with the gap, and the injection hole is closed. Polarizers may be bonded, as needed, at the incidence side and the emission side of the liquid crystal panel 16.

Although in the above liquid crystal panel 16, the TFT substrate is used as a liquid crystal driving substrate, other liquid crystal driving substrates, such as a TFD substrate and an STN substrate, may be used instead of the TFT substrate.

A projection display apparatus (liquid crystal projector) using the liquid crystal panel 16 is described below.

Figure 4:
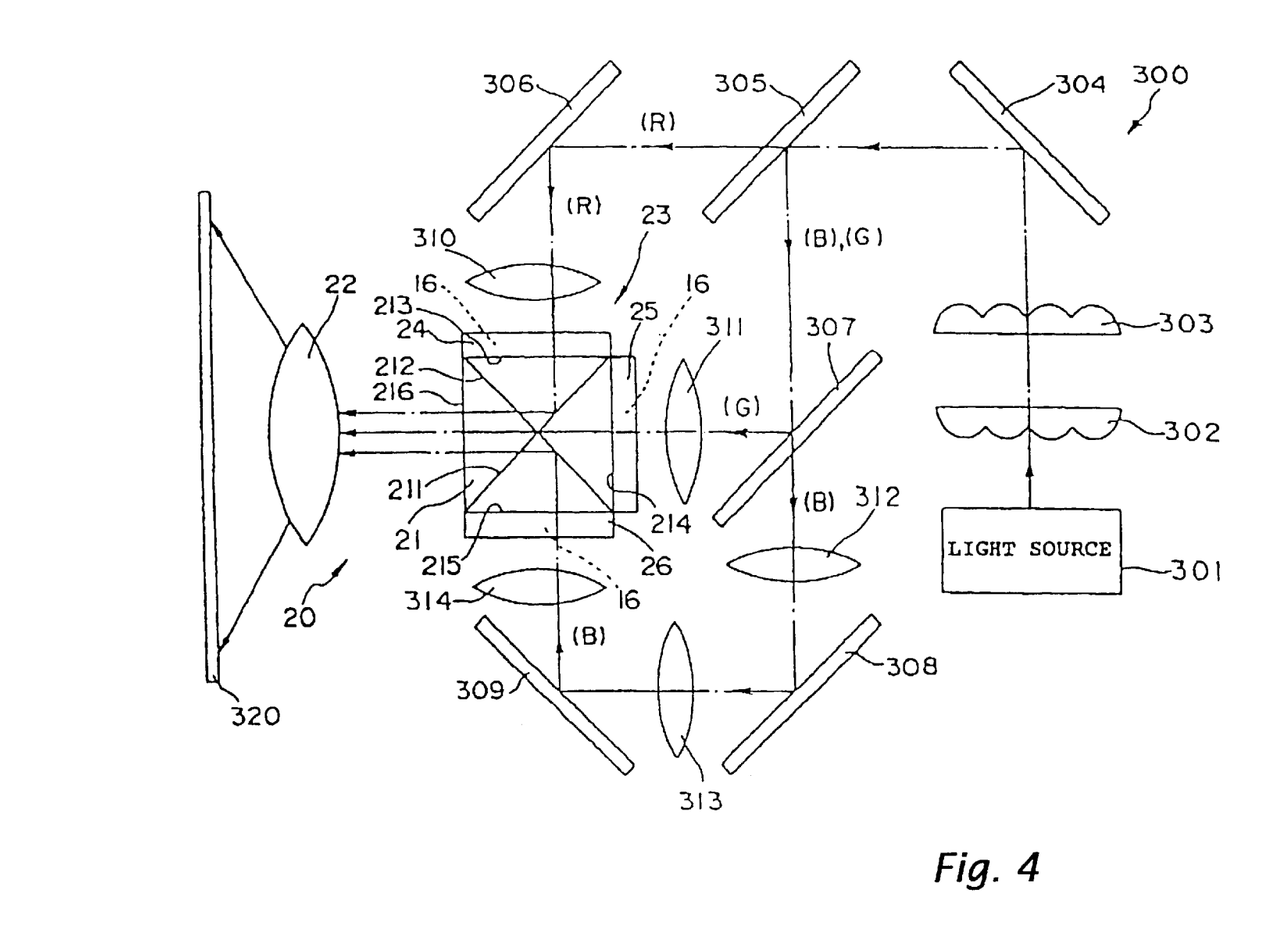
FIG. 4 is a schematic illustration showing an optical system of a projection display apparatus according to the example of the present invention.

FIG. 4 is a schematic drawing showing an optical system of a projection display apparatus according to the present invention.

In the drawing, a projection display apparatus 300 includes a light source 301, an illumination optical system provided with a plurality of integrator lenses, a color-splitting optical system (light-guiding optical system) provided with a plurality of dichroic mirrors and the like, a liquid crystal light valve (liquid crystal light shutter array) 24 associating with red (for red), a liquid crystal light valve (liquid crystal light shutter array) 25 associating with green (for green), a liquid crystal light valve (liquid crystal light shutter array) 26 associating with blue (for blue), a dichroic prism (color-synthesizing optical system) 21 including a dichroic mirror 211 for reflecting only red light and a dichroic mirror 212 for reflecting only blue light, and a projection lens (projection optical system) 22.

The illumination optical system includes integrator lenses 302 and 303. The color-splitting optical system includes mirrors 304, 306, and 309, a dichroic mirror 305 for reflecting blue light and green light (transmitting only red light), a dichroic mirror 307 for reflecting only green light, a dichroic mirror 308 for reflecting only blue light (or a mirror for reflecting only blue light), and condenser lenses 310, 311, 312, 313, and 314.

The liquid crystal light valve 25 includes the above liquid crystal panel 16, a first polarizer (not shown) connected to the incidence side of the liquid crystal panel 16 (the side at which the microlens substrate is disposed, that is, the side opposite to the dichroic prism 21), and a second polarizer (not shown) connected to the emission side of the liquid crystal panel 16 (the side opposite to the microlens substrate, that is, the side of the dichroic prism 21). The liquid crystal light valves 24 and 26 have the same configuration as that of the liquid crystal light valve 25. The liquid crystal panels 16 included in the individual liquid crystal light valves 24, 25, and 26 are connected, respectively, to a driving circuit which is not shown.

In the projection display apparatus 300, the dichroic prism 21 and the projection lens 22 form an optical block 20. The optical block 20 and the liquid crystal light valves 24, 25, and 26 fixed to the dichroic prism 21 form a display unit 23.

The operation of the projection display apparatus 300 is described below.

White light beams (white light fluxes) emitted by the light source 301 are transmitted by the integrator lenses 302 and 303. The optical strength (luminance distribution) of the white light beams is made uniform by the integrator lenses 302 and 303.

The white light beams transmitted by the integrator lenses 302 and 303 are reflected to the left in FIG. 4 by the mirror 304. Blue light beams (B) and green light beams (G) of the reflected light beams are reflected downwardly in FIG. 4 by the dichroic mirror 305, and red light beams (R) are transmitted by the dichroic mirror 305.

The red light beams transmitted by the dichroic mirror 305 are reflected downwardly in FIG. 4 by the mirror 306. The reflected light beams are condensed by the condenser lens 310 and are applied to the liquid crystal light valve 24 for red.

The Green light beams, out of the blue light beams and the green light beams which were reflected by the dichroic mirror 305, are reflected to the left in FIG. 4 by the dichroic mirror 307. The blue light beams are transmitted by the dichroic mirror 307.

The green light beams reflected by the dichroic mirror 307 are condensed by the condenser lens 311 and are applied to the liquid crystal light valve 25 for green.

The blue light beams transmitted by the dichroic mirror 307 are reflected to the left in FIG. 4 by the dichroic mirror (or the mirror) 308, and the reflected light beams are reflected upwardly in FIG. 4 by the mirror 309. The blue light beams are condensed by the condenser lenses 312, 313, and 314, and are applied to the liquid crystal light valve 26 for blue.

Thus, the white light beams emitted by the light source 301 are split into three primary colors of red, green, and blue by the color-splitting optical system, and are guided and applied to the corresponding liquid crystal light valves.

The pixels (the thin-film transistors 173 and the pixel electrodes 172 connected thereto) of the liquid crystal panel 16 included in the liquid crystal light valve 24 are switch-controlled (on-off-controlled), that is, are modulated by a driving circuit (driving means) which operates in accordance with an image signal for red.

In the same fashion, the green light beams and the blue light beams are applied to the liquid crystal light valves 25 and 26, respectively, and are modulated by the liquid crystal panels 16 included in the individual liquid crystal light valves, thereby forming images for green and blue, respectively. In this case, the pixels of the liquid crystal panel 16 included in the liquid crystal light valve 25 are switch-controlled by a driving circuit which operates in accordance with an image signal for green. The pixels of the liquid crystal panel 16 included in the liquid crystal light valve 26 are switch-controlled by a driving circuit which operates in accordance with an image signal for blue.

Thus, the red, green, and blue light beams are modulated by the liquid crystal light valves 24, 25, 26, respectively, and images for red, green, and blue are formed, respectively.

The image for red formed by the liquid crystal light valve 24, that is, the red light beams from the liquid crystal light valve 24 are applied to the dichroic prism 21 at a surface 213 and are reflected to the left in FIG. 4 by the dichroic mirror 211, are transmitted by the dichroic mirror 212, and are emitted from an emitting surface 216.

The image for green formed by the liquid crystal light valve 25, that is, the green light beams from the liquid crystal light valve 25 are applied to the dichroic prism 21 at a surface 214, are transmitted by the dichroic mirrors 211 and 212, and are emitted from an emitting surface 216.

The image for blue formed by the liquid crystal light valve 26, that is, the blue light beams from the liquid crystal light valve 26 are applied to the dichroic prism 21 at a surface 215 and are reflected to the left in FIG. 4 by the dichroic mirror 212, are transmitted by the dichroic mirror 211, and are emitted from an emitting surface 216.

The colored light beams from the respective liquid crystal light valves 24, 25, and 26, that is, the images formed by the liquid crystal light valves 24, 25, and 26, respectively, are synthesized again by the dichroic prism 21, whereby colored images are formed. The images are projected (enlarged and projected) on a screen 3 disposed in a predetermined position by the projection lens 22.

EXAMPLES

Experiment 1

Twelve types of resins were prepared, as described below.

Example 1

7702 (made by Kyoritsu Chemical & Co., Ltd.)

Example 2

V2402P (made by Nippon Kayaku Co., Ltd.)

Example 3

8255 (made by NTT Advanced Technology Corporation)

Example 4
8357 (made by NTT Advanced Technology Corporation)

Example 5
8358 (made by NTT Advanced Technology Corporation)

Example 6
UVO-114 (made by Epoxy Technology, Inc.)

Example 7
30Y360 (made by Three Bond Co., Ltd.)

Example 8
Hv2 (made by Adell Corporation)

Example 9
SSV (made by Optical Products Operations Division of Matsushima Plant of Seiko Epson Corporation)

Example 10
SLU (made by Optical Products Operations Division of Matsushima Plant of Seiko Epson Corporation)

Comparative Example 1
X-8740 (made by Kyoritsu Chemical & Co., Ltd.)

Comparative Example 2
KAYARAD M-10 (made by Nippon Kayaku Co., Ltd.)

Viscosity at 25° C. of each resin (before curing) described above was measured, of which the result is shown in the following table 1.

Each resin was applied with an ultraviolet light or was heated so as to be cured. The light amount for curing when cured (the temperature and time for curing in cases of thermosetting resins) and the index of refraction n after curing are shown in table 1.

Experiment 2

Microlens substrates were manufactured by using the respective resins, as described below.

Green silica-glass substrates, each having a thickness of 1 mm, were prepared as base materials. The silica-glass substrates were dipped in a cleaning agent (a mixture of sulfuric acid and an aqueous solution of hydrogen peroxide) at 85° C., and were cleaned at surfaces thereof.

-1- A film of polycrystalline silicon was deposited on front and rear surfaces of each silica-glass substrate to a thickness of 0.4 $\mu$m by a CVD method.

The deposition was performed by disposing the silica-glass substrate in a CVD furnace which was set to 600° C. and 80 Pa and supplying $SiH_4$ at a speed of 300 ml/minute.

-2- Openings associating with concavities for microlenses to be formed were formed in the deposited polycrystalline silicon film.

The formation was performed in a manner such that a resist layer having a pattern of concavities to be formed was formed with a photoresist on the polycrystalline silicon film. Dry-etching was performed for the polycrystalline silicon film by using a CF gas, thereby forming the openings, and a resist layer was removed.

-3- The silica-glass substrate was dipped in an etching agent (an aqueous solution containing a mixture of 10% of fluoric acid and 10% of glycerin) so as to perform wet-etching thereon, and the concavities for microlenses having curved surfaces curved in an arc (diameter: approximately 25 $\mu$m, depth: approximately 10.4 $\mu$m) were formed in the silica-glass substrate.

The concavities were disposed in a region of length× width=13.8×18.5 mm and were formed in a matrix of 768×1024 concavities.

-4- The silica-glass substrate was dipped in an aqueous solution of 15% tetramethyl ammonium hydroxide, and the polycrystalline silicon film deposited on the front and rear surfaces was removed.

-5- As shown in FIG. 5, the resin before curing was supplied in a slightly excessive amount to an end part (a side) of the surface of the silica-glass substrate provided with the concavities therein, a cover glass made of silica glass of approximately 0.5 mm-thick (the glass layer 8) was placed on the surface applied with the resin thereto, the cover glass was depressed gradually from the end part toward the other end part, whereby the resin (the resin 91) before curing moved between the silica-glass substrate and the cover glass toward the other end part and was spread. By this operation, air (air bubbles) between the silica-glass substrate and the cover glass was discharged, whereby the resin reliably filled the concavities for forming microlenses.

-6- Then, the distance between the silica-glass substrate and the cover glass was adjusted by applying pressure evenly over the cover glass, so that the thickness of the resin layer after curing became 10 $\mu$m, whereby the silica-glass substrate and the cover glass were bonded to each other via the resin.

-7- The resin between the silica-glass substrate and the cover glass was cured by applying an ultraviolet light or by heating, thereby forming the resin layer, and the microlenses were formed in the concavities.

The conditions of curing the resin are shown in table 1.

-8- Lastly, the cover glass was ground and polished so that the thickness thereof became 50 $\mu$m, whereby the microlens substrates having a configuration shown in FIGS. 1 and 2(e) were obtained.

(Evaluation 1)

The microlens substrates thus made were examined with the naked eye and under a microscope for air bubbles remaining in the resin layer, of which the result is shown in the following table 1. The evaluation criteria are as follows.

⊚: No residual of air bubbles was found at all.

○: Few air bubbles were found outside the region in which the microlenses were formed.

Δ: Residual of a small amount of air bubbles was found.

×: Remarkable residual of air bubbles was found.

Experiment 3

A light shielding film (Cr film), that is, a black matrix having a thickness of 0.16 $\mu$m, which was provided with openings in positions associating with the microlenses of the cover glass, was formed on each microlens substrate by a sputtering method or a photolithographic method. An ITO film (transparent conductive film) having a thickness of 0.15 $\mu$m was formed on the black matrix by a sputtering method, thereby manufacturing opposing substrates for liquid crystal panels.

(Evaluation 2)

Concerning each opposing substrate for a liquid crystal panel, the uniformity in the thickness of the resin layer between the silica-glass substrate and the cover glass was evaluated. Since the non-uniformity in the thickness of the resin layer is represented by a deflection (deformation) of the cover glass, the deflection of the cover glass was measured by using a deflection-measuring apparatus "GPI-XPHR" made by Zygo Corporation, of which the result is shown in the following table 1. The evaluation criteria are as follows. The "reference plane" herein referred to represents the position of a surface of the cover glass at the average thickness of the cover glass.

⊚: The maximum height and the maximum depth from the reference plane of the surface of the cover glass are individually not greater than ±0.5 $\mu$m.

○: The maximum height and the maximum depth from the reference plane of the surface of the cover glass individually exceed ±0.5 μm and are not greater than ±1.5 μm.

Δ: The maximum height and the maximum depth from the reference plane of the surface of the cover glass individually exceed ±1.5 μm and are not greater than ±2.0 μm.

×: The maximum height and the maximum depth from the reference plane of the surface of the cover glass individually exceed ±2.0 μm.

(Evaluation 3)

Concerning each opposing substrate for a liquid crystal panel, light was applied to the silica-glass substrate side, and an amount of transmitted light (emitted light) was measured at the cover glass side at multiple points by using a spectrophotometer U-4000 made by Hitachi, Ltd., whereby evaluation was performed whether or not non-uniformity (variation) in the luminance of the emitted light between each pixel (microlens) was found. The result is shown in table 1. The evaluation criteria are as follows.

⊚: Non-uniformity in the luminance of the emitted light was not found at all.

○: Non-uniformity of a low level in the luminance of the emitted light was found at 1 to 3 points.

Δ: Non-uniformity in the luminance of the emitted light was found at 1 to 5 points.

×: Non-uniformity in the luminance of the emitted light was found at a number of points.

Examination

As shown in FIG. 6, when a resin having low viscosity was used, as in the examples according to the present invention, air bubbles did not remain, thereby making the thickness of the resin layer uniform, whereby deflection (deformation) of the cover glass was not produced. As a result, non-uniformity in the luminance of the emitted light was avoided.

On the other hand, when a resin having high viscosity was used, as in the comparative examples, air bubbles remained, thereby making the thickness of the resin layer uneven, whereby deflection (deformation) of the cover glass was produced. As a result, non-uniformity in the luminance of the emitted light was found.

Experiment 4

Liquid crystal panels having a configuration shown in FIG. 3, and liquid crystal projectors having a configuration shown in FIG. 4 were manufactured by using several microlens substrates (opposing substrates for liquid crystal panels) according to each above example of the present invention, from the example superior results being obtained. As a result, defective products and the like were not found, and the liquid crystal panels and the liquid crystal projectors were manufactured in a superior manner. The obtained liquid crystal projectors could project images in a proper way without non-uniformity in the brightness.

According to the present invention, as described above, the resin layer can have a uniform thickness, in which residual air bubbles can be suppressed or avoided.

Therefore, according to the present invention, the yield in production of the liquid crystal panels, and in its turn, of the projection display apparatus can be improved.

What is claimed is:

1. A method for manufacturing a microlens substrate comprising the steps of:

forming a plurality of concavities on a first substrate;

supplying a resin before curing having a viscosity of not higher than 500 cP at 25° C. onto a surface of the first substrate provided with the concavities;

bonding a second substrate to the first substrate via the resin; and forming microlenses in the concavities by curing the resin.

2. A method for manufacturing a microlens substrate according to claim 1, wherein an index of refraction n after curing of the resin is not lower than 1.35.

3. A method for manufacturing a microlens substrate according to claim 1, wherein the resin is an ultraviolet curable resin.

4. A microlens substrate manufactured by a method for manufacturing a microlens substrate according to claim 1.

5. A microlens substrate comprising:

a first substrate provided with a plurality of concavities;

a second substrate bonded to the first substrate via a resin layer; and microlenses formed with a resin filling the concavities, wherein the resin layer is formed by curing a resin having a viscosity before curing of not higher than 500 cP at 25° C.

6. A microlens substrate according to claim 5, wherein an index of refraction n of the resin after curing is not lower than 1.35.

7. A microlens substrate according to claim 5, the resin is an ultraviolet curable resin.

8. An opposing substrate for a liquid crystal panel comprising:

a microlens substrate including a first substrate, a second substrate, and a resin layer provided between the first substrate and the second substrate, the resin layer being formed by curing a resin having a viscosity before curing of not higher than 500 cP at 25° C.; and a transparent conductive film provided either on the second substrate or on the first substrate.

9. An opposing substrate for a liquid crystal panel comprising:

a microlens substrate including a first substrate, a second substrate, and a resin layer provided between the first substrate and the second substrate, the resin layer being formed by curing a resin having a viscosity before curing of not higher than 500 cP at 25° C.;

a black matrix provided either on the second substrate or on the first substrate; and a transparent conductive film covering the black matrix.

10. A projection display apparatus comprising:

three light valves corresponding to red, green, and blue;

a light source;

a color-splitting optical system for splitting light from the light source into red, green, and blue light beams and guiding the light beams to the corresponding light valves;

a color-synthesizing optical system for synthesizing the images; and a projection optical system for projecting the synthesized images, wherein the light valves include a microlens substrate having a resin layer formed by curing a resin having a viscosity before curing of not higher than 500 cP at 25° C.

11. A method of preparing a microlens substrate, comprising:

forming a plurality of concavities on a glass substrate;

supplying a resin with a viscosity of less than 500 cP at 25° C. to a first end portion of said glass substrate;

depressing a glass layer from said first end portion toward a second end portion of said glass substrate thereby dispersing said resin over said concavities; and curing said resin to form microlenses.

12. The method according to claim 11, wherein the resin has an index of refraction greater than 1.35.

13. The method according to claim 11, wherein the resin further comprises an ultraviolet curing resin.

14. The method according to claim 11, wherein the thickness of the resin is between 0.1 to 100 $\mu$m.

15. The method according to claim 11, wherein the resin further comprises an acrylic, epoxy, acrylic epoxy, vinyl, or thiourethane resin.

* * * * *

UNITED STATES PATENT AND TRADEMARK OFFICE
CERTIFICATE OF CORRECTION

PATENT NO. : 6,407,866 B1
DATED : June 18, 2002
INVENTOR(S) : Hideto Yamashita, Nobuo Shimizu and Shinichi Yotsuya It is certified that error appears in the above-identified patent and that said Letters Patent is hereby corrected as shown below:

Column 8,
Line 6, "no t" should be -- not --

Column 9,
Line 58, "Green" should be -- green --

Column 12,
Lines 37 and 65, "○" should be -- ◎ --

Column 13,
Line 22, "○" should be -- ◎ --

Signed and Sealed this

Twenty-fourth Day of June, 2003

JAMES E. ROGAN
*Director of the United States Patent and Trademark Office*